United States Patent [19]

Jay

[11] Patent Number: 4,728,551

[45] Date of Patent: Mar. 1, 1988

[54] FLOWABLE PRESSURE COMPENSATING FITTING MATERIALS

[76] Inventor: Eric C. Jay, 855 Circle Dr., Boulder, Colo. 80302

[21] Appl. No.: 17,711

[22] Filed: Feb. 24, 1987

[51] Int. Cl.$^4$ .......................... A47C 7/02; A43B 5/04; C08L 91/00

[52] U.S. Cl. ........................................ 428/76; 428/406; 36/71; 36/93; 36/117; 106/122; 106/272; 5/450

[58] Field of Search ................ 428/76, 406, 484, 497; 36/71, 93, 117; 106/122, 272; 5/450

[56] References Cited

U.S. PATENT DOCUMENTS

| | | | |
|---|---|---|---|
| 4,144,658 | 3/1979 | Swan, Jr. | 36/71 |
| 4,229,546 | 10/1980 | Swan, Jr. | 36/71 |
| 4,255,202 | 3/1981 | Swan, Jr. | 36/71 |
| 4,588,229 | 5/1986 | Jay | 5/450 |

*Primary Examiner*—John E. Kittle
*Assistant Examiner*—Beth A. Bozzelli
*Attorney, Agent, or Firm*—Cook, Wetzel & Egan, Ltd.

[57] ABSTRACT

A flowable, pressure-compensating material, confined in an envelope, comprises a flowable, continuous-phase of oil having dispersed therein discrete hollow microbeads and a colloidal silica. The pressure-compensating material, which is flowable in response to continuously applied pressure, but is essentially non-flowable in the absence of pressure, is relatively insensitive to temperature variations.

8 Claims, No Drawings

FLOWABLE PRESSURE COMPENSATING FITTING MATERIALS

The present invention is directed to flowable pressure compensating fitting materials which are used in seating applications and other applications wherein the human body is in close contact with the pressure compensating fitting material. The compositions of the present invention have particular application to medical seating uses, such as wheelchair cushions and the like.

BACKGROUND

A number of viscous flowable pressure compensating fitting materials have been developed in the prior art for a wide variety of utilities. Such materials are generally stable so as to provide firm support and comfort to the user while allowing the pressure compensating fitting material to flow in response to continuous pressure in order to adapt to the particular body part involved. Such compositions and pads based on such compositions are described in U.S. Pat. Nos. 4,144,458; 4,229,546; 4,255,202; and 4,588,229, among others. The compositions described in these patents are, generally speaking, comprised of a mixture of oil, wax, and either glass microbeads or resin microbeads. The microbeads provide the composition with some structure, but because of their relative light weight, the microbeads reduce the density of the composition. Light weight products are desirable and important, particularly in large cushions or pads for wheelchairs wherein the weight of the cushion can be a major factor. The mixture of oil and wax in the composition provides flowability to the composition when subjected to pressure. The oil-wax mixture also maintains a high viscosity in the overall composition, whereby the pad will retain its shape in the absence of pressure.

The prior art products have worked quite well in most applications, but when subjected to temperatures higher than room temperature, such as body temperatures encountered in wheelchair cushion pads, wherein the wheelchair is used as much as 18 or 20 hours per day, 365 days per year, separation of the glass or resin microbeads from the oil-wax mixture occurs to form a hard, non-flowable mass. Separation of the microbeads from the oil-wax results in masses of microbeads which apparently "float" on top of the oil-wax mixture, producing hard, non-flowable lumps which cause discomfort to the user and potential skin breakdown (pressure sones). The tendency of the microbeads to separate is also a problem in vertical applications, such as wheelchair back cushions. Separation of these components has also been observed in cushions which are left in closed automobiles in the sunlight, wherein temperatures above 100° F. are encountered.

Sometimes the separation of the microbeads can be corrected by kneading the pad to redisperse the microbeads in the oil-wax composition. However, when the separation has progressed too far, hard lumps are formed which cannot effectively be redispersed by kneading. Moreover, in many usages, the fitting material is located in inaccessible places which makes it difficult or impossible to knead the flowable pressure compensating material back to its original dispersed form.

The prior art flowable compositions are also extremely temperature sensitive. For example, a pad left in a cold car overnight will be dangerously firm to sit on, as it can't conform to relieve pressure. Conversely, a pad warmed to skin temperature (after 2 hours of sitting) will develop a watery texture and no longer afford the same stability and support as a pad at room temperature. Stability and support are prime requirements in seating for disabled person, as they lose function when sitting on unstable seating surfaces.

It is believed that many of the foregoing problems are related to the wax component of the prior art flowable composition. The wax used in such compositions is temperature sensitive so that it flows and tends to separate from the microbeads at warmer temperatures. The temperature sensitivity also results in a change in viscosity at low temperatures as compared to relatively high temperatures.

THE PRESENT INVENTION

The present invention is based on the discovery that the wax can be removed from the flowable pressure compensating fitting materials of the prior art and a small amount of colloidal silica added to the composition to produce a flowable fitting composition which is relatively insensitive to temperature variation and which does not have the tendency to separate at body temperature in the manner of prior art compositions.

The fitting material essentially consists of a compatible combination of (1) a flowable continuous phase comprising oil as the principal component, and (2) colloidal silica, such as Cab-O-Sil, uniformly dispersed in the continuous phase. These components are homogeneously mixed to provide an essentially homogeneous mixture which is flowable when subjected to pressure, but which tends to retain its shape, at room temperature, when pressure is removed.

Preferably, the composition also includes discrete, lightweight, sturdy, hollow glass microbeads. As used herein, "glass" describes microbeads including glassy, siliceous or ceramic microbeads.

The composition may include wax of the type used in the prior art compositions, but generally it is essential to use an amount of wax substantially lower than that used in conventional prior art compositions. In the preferred composition, no wax is used.

THE COMPOSITION PROPORTIONS

The flowable, continuous phase oil, either with or without the wax, forms a coherant, viscous, flowable material which preferably constitutes a major portion, i.e., at least 50%, by weight of the composition.

The colloidal silica comprises a minor proportion of the overall composition. In a composition made up only of oil and colloidal silica, up to 20% of colloidal silica can be used, although the preferred level is about 9% by weight. As glass microbeads are introduced into the composition, the required level for the colloidal silica reduces. Also the addition of wax to the continuous phase will reduce, somewhat, the requirements for the colloidal silica.

The glass microbeads are discrete micro size particles, uniformly dispersed or distributed throughout the continuous phase, and thus constitute a discontinuous solid phase. Although up to 60% by weight of glass beads may be used for some purposes, it is generally preferred to use about 30% by weight of the glass microbeads in the composition. The glass microbeads are not essential to the composition insofar as the stability and flow characteristics are concerned, but the microbeads serve to reduce the weight of the composition, and when used at the appropriate levels, the glass microbeads do not interfere with the flow characteristics, the rheology or stability of the composition.

THE OIL

The oil component of the fitting material may be a suitable natural, synthetic, vegetable, or petroleum-based oil (neutral blending or bright stock). In order to facilitate control of the flow characteristics of the finished fitting material, it is important not to use unsaturated natural or vegetable drying or semi-drying oils that are unsaturated in such a manner or to such a level as to oxidize, thicken or harden significantly (e.g., polymerize or cross-link) with time or conditions of storage or use, which in many instances is reflected by the oil having an excessively high or unsatisfactory iodine number.

The oil component, for example, may comprise petroleum-based oil, such as exemplified by "Carnea" 21 oil, "Tufflo" 6204 oil, "Topco" Motor Oil, S.A.E. 20 (supplied by the King Super Market, Boulder, Co.), R Industrial #5-H oil [a neutral base oil supplied by American Oil Co. having a typical viscosity of 300–320 sec. (S.U.V.) at 100° F., typical flash point of 450° F., typical pour point (max.) of 0, and typical viscosity index (min.) of 95], or suitable admixtures thereof. Moreover, if desired, vegetable oil, such as coconut oil (e.g., SC 11518 coconut oil supplied by Sargent-Welch Scientific Co., Skokie, Il., may be used, at least for some purposes. "Tufflo" 6204 oil, supplied by Atlantic Richfield Company, is a technical grade naphthenic-type white mineral oil having the following typical properties:

| Viscosity | |
|---|---|
| 100° F., S.U.S. | 1750 |
| 210° F., S.U.S. | 91 |
| Gravity, A.P.I. | 23.4 |
| Specific Gravity 60/60 | 0.9135 |
| Density, lbs./gal. | 7.61 |
| Color, Saybolt | +20 |
| Flash Point, °F. | 465 |
| Pour Point, °F. | +15 |
| Aniline Point, °F. | 232 |
| Refractive Index, 20° C. | 1.4945 |
| Viscosity Gravity Constant | 0.840 |
| Molecular Weight | 490 |
| % Volatility, 22 hrs./225° F. | 0.3 |
| U.V. Absorptivity, 260 mu | 0.2 |
| Acid No. | 0.0 |
| Aromatics, % | 14 |
| Saturates, % | 86 |
| Distillation, °F. | |
| I.B.P. | 620 |
| 5% | 745 |
| 50% | 880 |
| 95% | 1020 |

The pour point of the oil is a critical parameter, and the quantities of the and microbeads must be adjusted to accommodate the oil pour point. In the composition, the oil forms the continuous phase of the composition, and to some extent, the flow characteristics of the composition depend upon the oil and its pour point. Generally speaking, oils having a pour point between zero and +15 degrees have been found suitable, although oils having other pour points can be used if appropriate adjustments are made to the composition.

THE COLLOIDAL SILICA

The colloidal silica which forms a component of the composition should have a particle size between about 5 millimicrons through 200 millimicrons. The preferred range of particle sizes is from about 7 to 50 millimicrons. Suitable colloidal silicas are described in the patent literature. Other colloidal material, such as alumina, could also be used.

The preferred colloidal silica is sold under the trademark Cab-O-Sil. Cab-O-Sil is silicon dioxide produced by the hydrolysis of silicon tetrachloride vapor in a flame of hydrogen and oxygen. The process produces spheres having extremely small particle size with an enormous surface area. The diameter of the spheres are varied through process parameters, but have averages in the 7 to 30 millimicron range. This produces grades with final surface areas ranging from 400 square meters per gram to 100 square meters per gram, respectively. The molten spheres, which are formed during the hydrolysis process, termed primary particles, collide and fuse with one another to form branched, three dimensional, chain-like aggregates. As the aggregates cool below the fusion temperature of (approximately 1710° C.) further collisions result in some reversable mechanical entanglement or agglomeration. Further agglomeration also takes place in the collection process. Residual hydrogen chloride is reduced to less than 200 ppm by calcination. The bulk density of the product is normally 2 pounds per cubic foot, although, depending upon the handling, may be as much as 4 pounds per cubic foot.

Commercially available grade of colloidal silica, sold under the trademark "Cab-O-Sil PTG", has been used successfully in the practice of the present invention and is used in the Examples which follow.

Although several Cab-O-Sil grades can be used, Cab-O-Sil PTG is the preferred grade, as is Cab-O-Sil M5. The non-rheological grades of Cab-O-Sil, such as MS7, MS75, and MS55, are not preferred.

Cab-O-Sil PTG has a surface area of approximately 200 meters per gram, a primary particle diameter of about 14 millimicrons and a standard bulk density of 2 pounds per cubic foot.

Applicant does not wish to be bound by the theory by which the composition of the present invention works, but it is postulated that as used in the composition of the present invention, the colloidal silica does not create any chemical bonding with any of the other components. The hydroxyl groups on the surface of the colloidal silica appear to set up a physical interlocking, possibly through a form of hydrogen bonding, to maintain the composition in its physical location unless it is subject to some external pressures. Advantageously, the composition which includes the colloidal silica, such as Cab-O-Sil PTG has a high viscosity while at rest, but when subject to high shear, has a lower viscosity. This enables the composition of the present invention to be handled and loaded into envelopes by subjecting the composition to mixing, i.e., shearing forces, without the need to heat the composition.

THE GLASS MICROBEADS

The microbeads used in the fitting composition are preferably discrete, hollow, microbeads. It is preferred to have microbeads which are of low density in order to reduce the weight of the overall composition. Accordingly, the hollow, spherical glass microbeads are preferred. If desired, other suitable micro-shapes or micro-forms may be used, such as solid glass or cellular forms of glass, but the advantage of low weight is sacrificed to some extent by using such forms. The micro-size of the hollow glass microbeads may be within the size range, for example, of about 10 to 300 microns.

The density of the glass microbeads should be, for example, about 0.05 to 0.70 gm./cc., or, more particularly, about 0.25 to 0.45 gm./cc. It is essential, however, that the density of the glass microbeads be lower than the combined density of the other components, namely, the wax-oil phase, and therefore the glass microbeads are considered to be a density-reducing component of the fitting material.

Glass microbeads sold by 3M under the trade designation B-37 have been successfully used in the compositions of the present invention. The B-37 microbeads have nominal density of 0.37 gm./cc., a range of density between 0.34 and 0.40 gm./cc., with a calculated bulk density of 0.19-0.27 gm./cc. These beads have approximate isostatic compressive strength of 2,000 psi. In addition to the B-37 microbeads, B-38 and B-25 microbeads may also be used. The B-37 microbeads are the preferred microbeads. Other sources of microbeads may be used, including eccospheres, hollow, unicellular microbeads sold by Emerson & Cuming, Inc. of Canton, Mass. under the designation 1G-25 glass microbeads.

THE WAX

The optional wax component, for example, may be a suitable natural, mineral, petroleum-based synthetic, vegetable, or animal wax (includes insect wax), such as beeswax [e.g., SC 10979 beeswax (yellow), supplied by Sargent-Welch Scientific Co., Skokie, Ill.], or microcrystalline wax.

The wax component, as such, although deformable under pressure, is substantially incompressible, as such, and is an essentially non-flowable solid at temperatures below about 110° F., but softens and flows at higher temperatures.

Particularly good results are obtained with microcrysalline wax. Microcrystalline wax is a mixture of solid hydrocarbons derived from petroleum. More particularly, it is a mixture of alkylated naphthenes (saturated cycloparaffins) and isoparaffins (branched chains) with varying amounts of normal paraffins (straight chains). Microcrystalline waxes generally have an average molecular weight of about 580 to 700, although in some instances the molecular weight of paraffin wax generally is much lower, usually ranging from about 260 to 420 and having individual molecules varying from about 20 to 30 carbon atoms. As the same implies, microcrystalline wax refers to the crystalline size when in the solid state, and has crystals that are much smaller than those of paraffin wax (sometimes referred to as macrocrystalline wax). Microcrystalline wax generally has good low temperature flexibility, adhesion and excellent resistance to moisture penetration under conditions of stress and strain, and, therefore, generally is preferred over paraffin wax, particularly when the fitting material is used in boots for use at low temperatures (e.g., ski boots).

In the fitting material, the preferred wax is HM 1319 wax, a microcrystalline wax-based, hot melt adhesive product formulated and supplied by HB Fuller Company, St. Paul, Min. That wax product is light yellow, has a typical "application" temperature of 180° F. to 200° F., and has a typical ring and ball softening point of 174° F. to 176° F. It essentially consists of 85% by weight of microcrystalline wax, and 15% by weight of "Tufflo" 6204 oil.

THE ENVELOPE

The envelope in which the flowable, pressure compensating fitting material is confined may be fabricated from any flexible material which is inert with respect to the flowable, pressure compensating material and the components thereof.

Generally, the envelope may be formed of a variety of flexible and pliable materials that provide a protective barrier for the flowable, pressure compensating fitting material. Preferably the material used for the envelope is heat sealable to provide a substantially impervious barrier to the flow or seepage therethrough of the components of the confined flowable, pressure compensating material. If the envelope is formed of a synthetic resinous film, the film should be flexible or elastomeric, both at ambient room temperatures and the temperatures at which the product is used, which can be in the vicinity of 100° F. It is important that the envelope material be durable and retain its flexible, plaible properties over extended period of use. The various envelope materials described in the prior art could be used as the envelope for the pressure compensating materials of the present invention.

THE MIXING PROCESS

The flowable compositions of the present invention may be produced using a variety of mixing processes. For example, the microbeads may be first placed in a mixing bowl. The silica is then added on top of the microbeads without mixing. Finally, the oil is added and all three components are mixed together in one step to form a homogeneous composition. This process is quicker and causes less "fly-away" of the microbeads, as compared to other mixing processes.

THE EXAMPLES

The following Examples will serve to illustrate the preparation of several flowable compositions within the scope of the present invention. Selected prior art compositions are described for comparative purposes. It is understood that these Examples are set forth merely for illustrative purposes and many other compositions and methods of producing flowable compositions are within the scope of the present invention. Those skilled in the art will recognize that compositions containing other levels of colloidal silica may be similarly prepared.

The compositions used in the Examples were prepared as follows:

The required amount of oil was placed in a mixing bowl. Microbeads, in the appropriate quantity, were added thereto, care being taken to avoid releasing the microbeads in the air. After the oil and microbeads had been completely mixed, the Cab-O-Sil was added with mixing required to get the desired viscosity. These compositions were placed, with no heating, in polyethylene bags and tested as is set forth in the Examples.

The oil used is a technical grade of naphthenic-type white mineral oil sold under the trademark "Tufflo" 6204.

The colloidal silica used in all of the Examples was Cab-O-Sil PTG grade, described above.

For each of the following Examples, B37 microbeads obtained from Minnesota Mining and Manufacturing were used.

The wax used was a microcrystalline wax comprising a mixture of solid hydrocarbons derived from petroleum. This wax is available under the indentification HM1319 from the HB Fuller Company of St. Paul, Minn.

EXAMPLE 1

The composition of Example 1 was as follows:

| COMPONENT | AMOUNT (% BY WEIGHT) |
| --- | --- |
| Oil | 61.5 |
| Colloidal Silica (Cab-O-Sil PTG) | 1.0 |
| Microbeads (B-37 from 3M) | 30.0 |
| Wax | 7.5 |

This composition was slightly stiffer than the prior art composition illustrated by Example 7.

EXAMPLE 2

The composition of Example 2 was as follows:

| COMPONENT | AMOUNT (% BY WEIGHT) |
| --- | --- |
| Oil | 63.5 |
| Colloidal Silica (Cab-O-Sil PTG) | 2.0 |
| Microbeads (B-37 from 3M) | 30.0 |
| Wax | 4.5 |

This composition was slightly stiffer than the prior art composition illustrated by Example 7.

EXAMPLE 3

The composition of Example 3 was as follows:

| Component | AMOUNT (% BY WEIGHT) |
| --- | --- |
| Oil | 65.0 |
| Colloidal Silica (Cab-o-Sil PTG) | 2.0 |
| Microbeads (B-37 from 3M) | 30.0 |
| Wax | 3.0 |

This composition was slightly stiffer than the prior art composition illustrated by Example 7.

EXAMPLE 4

The composition of Example 4 was as follows:

| COMPONENT | AMOUNT (% BY WEIGHT) |
| --- | --- |
| Oil | 67.0 |
| Colloidal Silica (Cab-O-Sil PTG) | 3.0 |
| Microbeads (B-37 from 3M) | 30.0 |
| Wax | 0 |

This composition feels identical to the prior art composition illustrated by Example 7.

EXAMPLE 5

The composition of Example 5 was as follows:

| COMPONENT | AMOUNT (% BY WEIGHT) |
| --- | --- |
| Oil | 66.0 |
| Colloidal Silica (Cab-O-Sil PTG) | 4.0 |

-continued

| COMPONENT | AMOUNT (% BY WEIGHT) |
| --- | --- |
| Microbeads (B-37 from 3M) | 30.0 |
| Wax | 0 |

This composition was slightly stiffer than the prior art composition illustrated by Example 7.

EXAMPLE 6

The composition of Example 6 was as follows:

| COMPONENT | AMOUNT (% BY WEIGHT) |
| --- | --- |
| Oil | 91.0 |
| Colloidal Silica (Cab-O-Sil PTG) | 9.0 |

EXAMPLE 7

The composition of Example 7 was as follows:

| COMPONENT | AMOUNT (% BY WEIGHT) |
| --- | --- |
| Oil | 58.0 |
| Microbeads (B-37 from 3M) | 30.0 |
| Wax | 12.0 |

TEMPERATURE SENSITIVITY TEST

The composition of each of Example 1 through 7 were subjected to testing for temperature sensitivity. Several portions fo the composition from each Example (50 grams of the composition) were placed in polyethylene bags and sealed. One bag from each Example was placed in a refrigerator held at about 45° F. to observe the effects of cold or low temperatures. Another bag from each Example was placed in an oven at 105° F. to determine the effect of elevated temperatures (above room temperatures). It is believed that the 105° F. temperature exceeds slightly the temperature generated in a wheelchair cushion (i.e., 95° F.) which is used for more than 2 or 3 hours.

All samples which contained wax (Examples 1, 2, 3 and 7) showed significantly greater sensitivity to temperature at 45° F., i.e., they were hard and unflexible and had very low flowability as compared to those without wax (Examples 4, 5 and 6). Those samples which had no wax showed no appreciable viscosity difference at 45° F. as compared to room temperature, whereas the prior art composition, Example 7, was notably stiffer at 45° F.

At higher temperatures the samples with wax (Examples 1, 2, 3 and 7) were considerably less viscous and more watery than the samples which contained no wax. The lack of temperature sensitivity in the compositions containing no wax is self-evident.

SEPARATION TESTING

To measure the tendency of the compositions to separate, several polyethylene "Zip-Lock" pouches approximately 2"×5" were filled with 45 grams of the composition of Examples 1 through 7 and hung vertically at room temperature, in an oven at 111° F. and in an oven at 158° F.

ROOM TEMPERATURE TESTING

None of the samples showed separation despite being hung at room temperature for 5 months.

TESTING AT 111° FOR 4 MONTHS

The tests run at 111° F. for 4 months was run because it accelerates the effect of sitting on a cushion and warming it to 95° F. It is estimated that this test is equivalent to sitting on the cushion 12 hours per day for about 1.5 years.

The prior art sample (Example 7) showed significant separation. The top of the pouch became too stiff and unflowable with a 1 inch pool of oil/wax mixture at the bottom of the pouch. This result was judged less desirable for use in cushions for long term seating application.

The composition of Example 1 showed some separation, wherein the oil/wax mixture migrated to the bottom of the pouch leaving a stiff agglomeration of microbeads at the top.

The products of Examples 2 and 3 (2% Cab-O-Sil) showed some separation, but less than the formula of Example 1.

Examples 3, 4 and 5 (containing 3% and 4% Cab-O-Sil, but no wax) showed no evidence of separation.

The use of Cab-O-Sil seems to prevent separation almost entirely when used at 3% and 4% concentration with no wax. Based on the results of the tests, the formula of Example 4 is preferred, because the viscosity at room temperature is closer to the prior art product, which is the desirable viscosity.

The compositions of the present invention, when confined in envelopes, may be used in a variety of applications, including wheelchair seats and other cushions, patient supporting system designed for beds or in orthopedic applications, pressure relief pads juxtaposed against body casts, supports and cushions, chair backs, ski boots, grips and other uses wherein the pressure compensating pad is used in close proximity to portions of the human body.

TESTING AT 158°

A test was developed to exaggerate the affects of leaving a flowable pad in a car closed up in the noonday sun, where the temperatures can elevate to in excess of 120° F.

Samples were made up in the manner described above and placed in the oven at 158° F. (70° C.) for 7 days. The formulas with 3% and 4% Cab-O-Sil, and no wax (Examples 4, 5 and 6), showed no visible separation and did not evidence any significant change in viscosity. However, when the pouches were opened, there was some separation observed in that the fluid at the bottom of the pouch was more oily than the fluid at the top. However, the fluid at the top was still fluid enough to be acceptable.

The prior art composition showed extreme separation which was visible without opening the pouch.

The compositions containing Cab-O-Sil (Examples 1 through 3) and some wax showed some separation, but significantly less than the prior art (Example 7). The compositions containing 1% or 2% Cab-O-Sil with some wax (Examples 1 through 3) were sufficiently stable that the flowable composition could be readily reconstituted by kneading the composition within the pouch. In other words, the separation was not as severe as the prior art composition (Example 7).

The forms of invention herein shown and described are to be considered only as illustrative. It will be apparent to those skilled in the art that numerous modifications may be made therein without departure from the spirit of the invention or the scope of the appended claims.

I claim:

1. A deformable, pressure-compensating pad comprising:
   a flexible protective envelope having confined therein a predetermined amount of viscous flowable, pressure-compensating material;
   said envelope being shaped to allow flow therein of confined material in response to continuously applied, deforming pressure loads exerted on the pad;
   said confined pressure-compensating material having a substantially homogeneous, flowable, continuous phase comprising an oil; a colloidal silica product, said silica product being uniformly distributed throughout said flowable, continuous phase; and hollow discreet glass microbeads, said oil being substantially non-hardening, said glass microbeads having a density lower than the combined density of said oil and said silica product, said glass microbeads being uniformly distributed throughout said flowable, continuous phase;
   said confined pressure-compensating material being characterized:
   by being flowable in response to continuously applied pressure, but being essentially non-flowable in the absence of such pressure;
   by a substantially homogeneous consistency which does not vary substantially in viscosity in response to ambient temperatures and ambient temperature changes; and
   by being resistant to phase separation.

2. A deformable, pressure-compensating pad as described in claim 1, wherein the pressure-compensating material comprises a major amount of oil, by weight.

3. A deformable, pressure-compensating pad as described in claim 2, wherein said pressure-compensating material comprises up to 9% by weight of colloidal silica based on the weight of the oil.

4. A deformable, pressure-compensating pad as described in claim 3, wherein said colloidal silica has an average particle size in the 7 to 30 millimicron range.

5. A deformable, pressure-compensating pad as described in claim 2, wherein said pressure-compensating material comprises about 30% by weight of glass microbeads.

6. A deformable, pressure-compensating pad as described in claim 5, wherein said glass microbeads have a density of about 0.25 to 0.45 gm./cc.

7. A deformable, pressure-compensating pad as described in claim 2, wherein the flowable, continuous phase includes a wax.

8. A deformable, pressure-compensating pad as described in claim 5, wherein said pressure-compensating material comprises up to 12% by weight of wax.

* * * * *